United States Patent
Moullet et al.

(10) Patent No.: US 10,682,733 B2
(45) Date of Patent: Jun. 16, 2020

(54) OPTIMIZED METHOD AND DEVICE FOR CRIMPING ATTACHMENT OF AN ABRADABLE PIECE SUPPORT TO A RADIALLY INNER WALL OF A VANE SECTOR OF A TURBOMACHINE

(71) Applicant: Safran Aircraft Engines, Paris (FR)

(72) Inventors: Bruno Julien, Jean Moullet, Vincennes (FR); Agostinho Da Silva Peixoto, Orgenoy (FR); Jérôme Joseph, Marcel Francoise, Dammarie les Lys (FR); Haniffa-tri Mohamed, Paris (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 181 days.

(21) Appl. No.: 15/472,686

(22) Filed: Mar. 29, 2017

(65) Prior Publication Data
US 2017/0282311 A1    Oct. 5, 2017

(30) Foreign Application Priority Data

Mar. 30, 2016   (FR) ...................................... 16 52731

(51) Int. Cl.
*B23P 11/00*     (2006.01)
*B23P 15/00*     (2006.01)
(Continued)

(52) U.S. Cl.
CPC .......... *B23P 11/005* (2013.01); *B23P 15/006* (2013.01); *F01D 9/044* (2013.01); *F01D 11/122* (2013.01);
(Continued)

(58) Field of Classification Search
CPC ....... B23P 11/005; B23P 15/006; B23P 15/14; F01D 9/044; F01D 9/042; F01D 11/122; F05D 2240/11
See application file for complete search history.

(56) References Cited

U.S. PATENT DOCUMENTS 5,680,703 A  * 10/1997 Ono ...................... B23P 11/005
                                                       137/15.19
2004/0200071 A1* 10/2004 Radocaj ................... B21K 1/42
                                                        29/892.11
(Continued)

FOREIGN PATENT DOCUMENTS

DE    10 2008 026941 A1    12/2009
EP       0 980 963 A       2/2000
(Continued)

OTHER PUBLICATIONS

Search Report issued in French Patent Application No. FR1652731 dated Nov. 21, 2016.

*Primary Examiner* — Christopher M Koehler
*Assistant Examiner* — Kyle A Cook
(74) *Attorney, Agent, or Firm* — Pearne & Gordon LLP (57) ABSTRACT

A method for attaching an abradable piece support by crimping to the radially inner wall of a vane sector of a turbomachine, comprises deforming opposite rims of the radially inner wall on opposite free axial ends of the abradable piece support respectively, jointly, by means of two pressure blocks (40A, 40B) respectively, which are attached to each other and delimiting a space (42) between them intended to accommodate a median portion of the abradable piece support. A crimping attachment device (30) comprising such pressure blocks can in particular be operated by means of a conventional press, and can enable the method for attaching the abradable piece support to be automated.

8 Claims, 6 Drawing Sheets

(51) Int. Cl.

|  |  |
|---|---|
| *F01D 9/04* | (2006.01) |
| *F04D 29/54* | (2006.01) |
| *F04D 29/08* | (2006.01) |
| *F04D 29/64* | (2006.01) |
| *F01D 11/12* | (2006.01) |
| *B21D 53/78* | (2006.01) |

(52) U.S. Cl.
CPC ......... *F04D 29/083* (2013.01); *F04D 29/542* (2013.01); *F04D 29/644* (2013.01); *B21D 53/78* (2013.01); *B23P 2700/01* (2013.01); *F05D 2220/323* (2013.01); *F05D 2230/23* (2013.01); *F05D 2240/11* (2013.01); *F05D 2240/12* (2013.01); *F05D 2260/36* (2013.01)

(56) References Cited

U.S. PATENT DOCUMENTS

| 2011/0164971 A1 | 7/2011 | Caucheteux |
| 2015/0354396 A1* | 12/2015 | Leszczynski ............. F01D 5/02 416/192 |

FOREIGN PATENT DOCUMENTS

| EP | 1 801 358 A1 | 6/2007 |
| EP | 2 947 349 A1 | 11/2015 |
| FR | 2 922 950 A1 | 5/2009 |

* cited by examiner

OPTIMIZED METHOD AND DEVICE FOR CRIMPING ATTACHMENT OF AN ABRADABLE PIECE SUPPORT TO A RADIALLY INNER WALL OF A VANE SECTOR OF A TURBOMACHINE

TECHNICAL FIELD

The present invention generally relates to the field of turbomachines, especially of the type for propelling aircrafts, and more particularly relates to a device and method for a crimping attachment of an abradable piece support, sometimes referred to as "abradable support", to a radially inner wall of a turbomachine vane sector, by deforming rims formed at opposite axial ends of the radially inner wall of the vane sector, respectively on opposite free axial ends of the abradable piece support.

STATE OF PRIOR ART

A turbomachine includes moving blade assemblies, sometimes also referred to as bladed wheels, and stationary vane assemblies, sometimes referred to as guide vane assemblies or distributors.

Each vane assembly is generally divided into several angular sectors circumferentially mounted end to end about an axis of the vane assembly.

Figure 1:
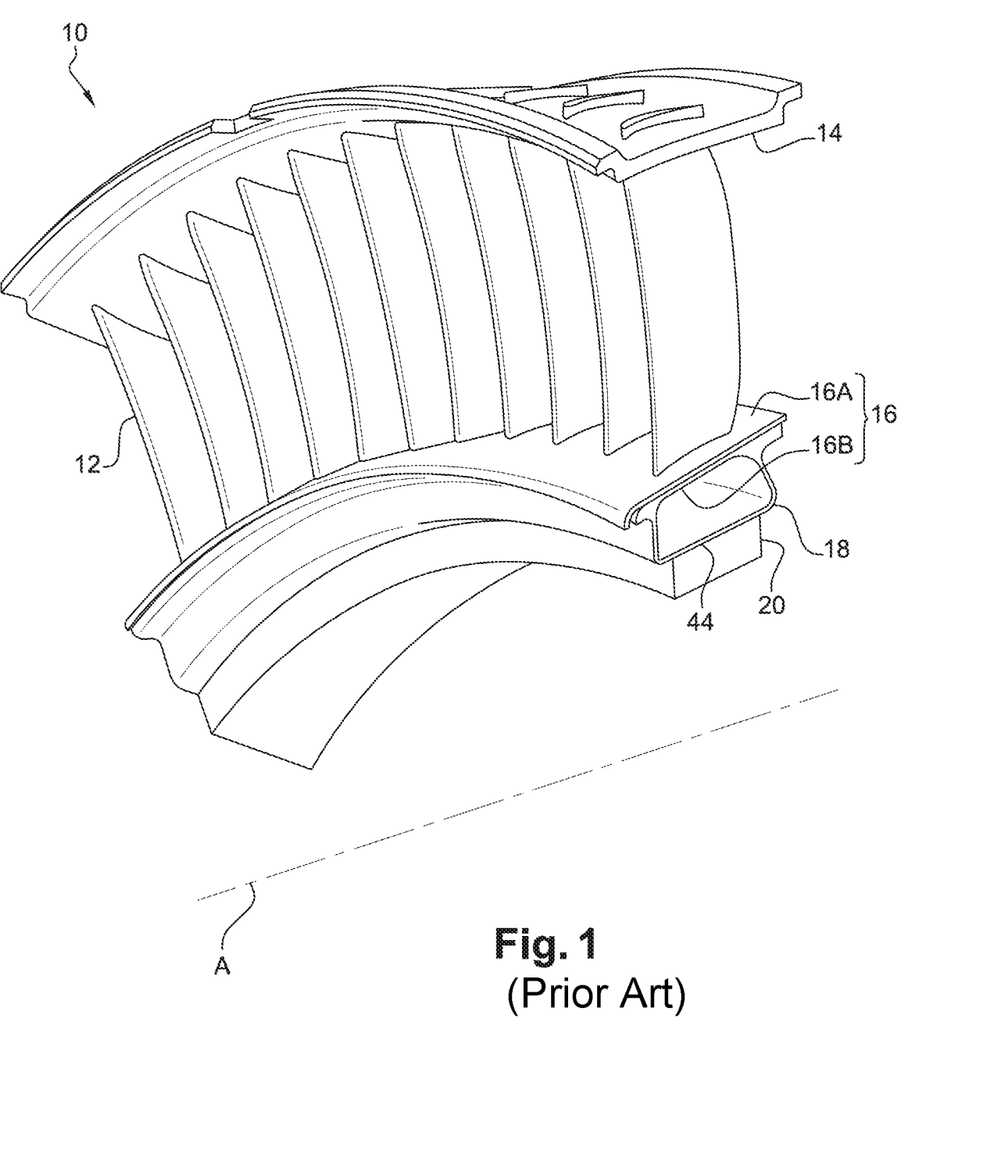
FIG. 1, already described, is a schematic perspective view of a vane sector of a turbomachine of a known type.
Figure 2A:
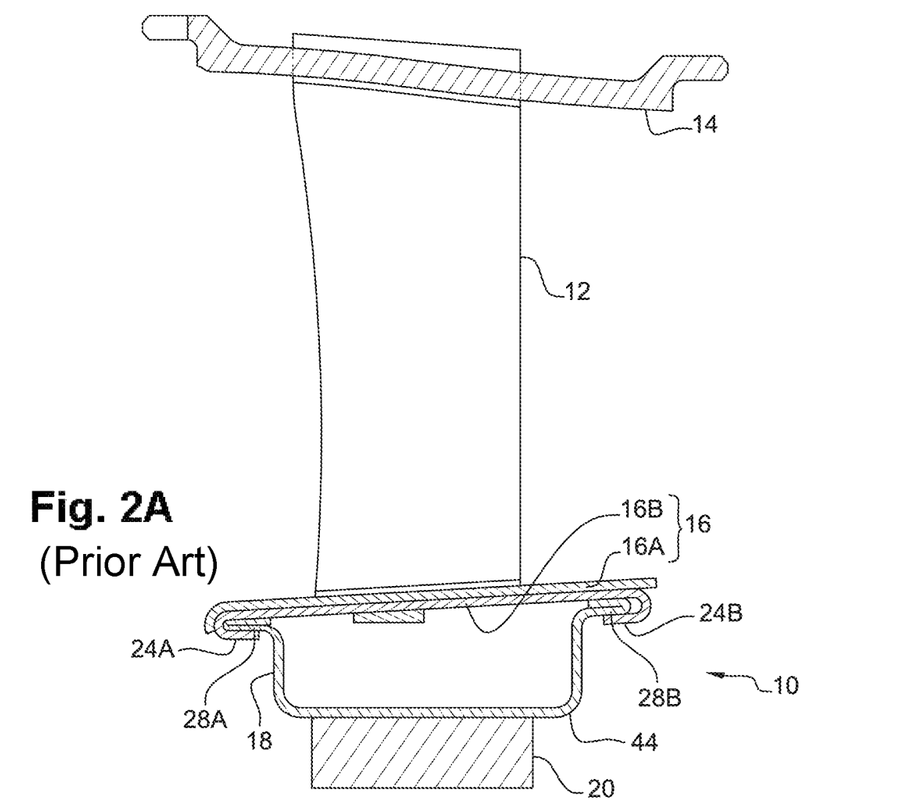
FIG. 2A, already described, is a schematic axial cross section view of the vane sector of FIG. 1.

FIGS. 1 and 2A illustrate a stator vane sector 10 of a known type, in a perspective and axial cross section view respectively. It is for example a stator vane sector of a compressor.

As shown in these figures, such a vane sector generally includes a plurality of vanes 12, a radially outer wall 14 (commonly referred to as "outer shell") connected to a radially outer end of the vanes 12, a radially inner wall 16 (commonly referred to as "inner shroud") connected to a radially inner end of the vanes 12, an abradable piece support 18 attached to the radially inner wall 16 on the radially inner side of this wall, and an abradable piece 20 attached to the support 18, on the radially inner side of this support. The radially inner wall 16 is generally formed by an outer aerodynamic casing 16A intended to internally delimit an annular flow channel of an air flow for interacting with the vanes 12, and by an inner structural wall 16B.

Figure 2B:
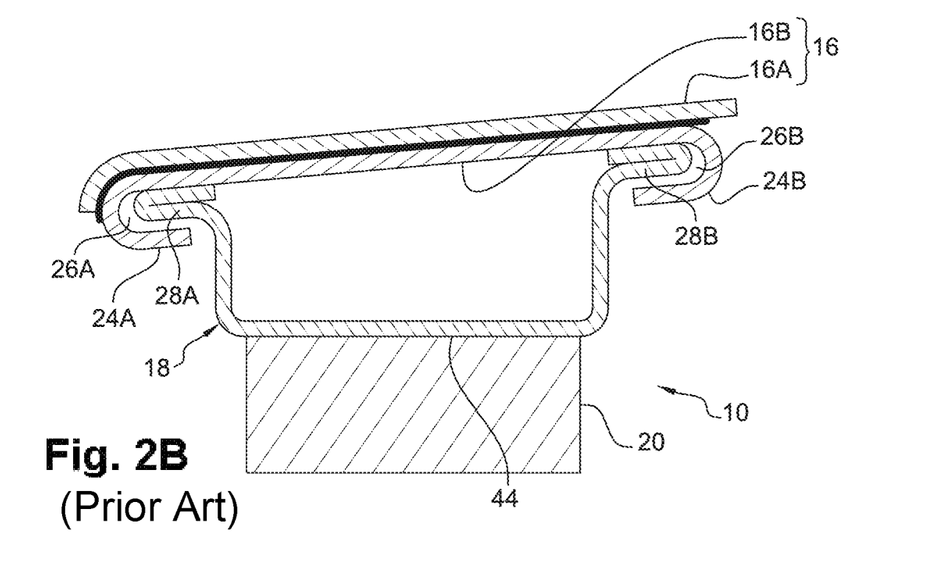
FIG. 2B, already described, is a view in a larger scale of a part of FIG. 2A, illustrating the vane sector before crimping the abradable piece support.

In certain types of vane assemblies, the radially inner wall 16 (if applicable, the inner structural wall 16B) has at its axial ends deformable rims 24A, 24B radially inwardly curved and axially curved towards each other, so as to form respective circumferential grooves 26A, 26B typically with a substantially U shaped cross section. Moreover, the abradable piece support 18 has free axial ends 28A, 28B, shaped as curved or not curved lugs, engaged in the circumferential grooves 26A, 26B, as more clearly appears in FIG. 2B. The circumferential grooves 26A, 26B form slides in which the free axial ends 28A, 28B of the support 18 can slide along the circumferential direction for placing the support 18.

Figure 2C:
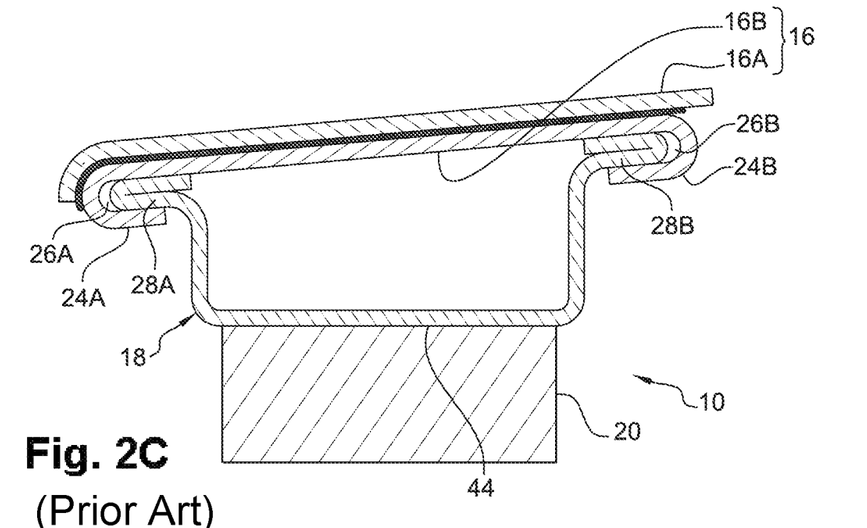
FIG. 2C, already described, is a view similar to FIG. 2B, illustrating the vane sector after crimping the abradable piece support.

In this case, attaching the abradable piece support 18 to the radially inner wall 16 is made by crimping by deforming the rims 24A, 24B on the free axial ends 28A, 28B so as to tighten the latter, as shown in FIG. 2C.

This operation is manually performed in several phases by means of a clamp suitable for this. An operator first applies the clamp on one of the rims 24A in order to deform it and thus tighten the corresponding axial end 28A, and then the operator applies the clamp on the other rim 26A in order to crush the latter and thus tighten the other axial end 28B.

In vane assemblies of this type, it is however desirable to simplify the operation of attaching by crimping the abradable piece support 18 to the radially inner wall 16 and to make this operation more reliable.

DISCLOSURE OF THE INVENTION

To that end the invention provides a method for crimping attachment of an abradable piece support to a radially inner wall of a vane sector of a turbomachine by deforming rims formed at opposite axial ends of the radially inner wall of the vane sector, respectively on opposite free axial ends of the abradable piece support.

According to the invention, the method comprises steps of:

providing a crimping attachment device comprising a first part including at least two pressure blocks secured to each other, delimiting a first space between them, and having respective pressure surfaces, and a second part able to support the radially inner wall of the vane sector;

installing the radially inner wall of the vane sector on the second part;

mounting the abradable piece support on the vane sector by respectively inserting the free axial ends of the abradable piece support into grooves respectively delimited by the rims of the radially inner wall of the vane sector, and by disposing a median portion of the abradable piece support in the first space or facing the latter; and causing a first part to be brought closer to the second part so that the pressure surfaces exert a pressure on the rims of the radially inner wall of the vane sector so as to deform these rims on the free axial ends of the abradable piece support, until the rims provide a tightening of the free axial ends of the abradable piece support.

Generally, the method according to the invention thus enables both free axial ends of an abradable piece support to be attached jointly to the radially inner wall of a stator blade sector, that is simultaneously or substantially simultaneously, which offers time saving and reliability gain relative to methods of a known type making use of a clamp.

Moreover, the method according to the invention can be readily automated, unlike abovementioned methods of a known type which necessarily require the intervention of a human operator.

Preferably, at the end of the step of causing the first part to be brought closer to the second part, an abradable piece attached to the median portion of the abradable piece support is housed in the first space.

The method can thus be applied to attaching an abradable piece support already fitted with an abradable piece, the latter being therefore accommodatable in the first space.

Preferably, the second part includes at least two bearing blocks delimiting a second space between them and having respective bearing surfaces. Moreover, at the end of the step of installing the radially inner wall of the vane sector on the second part, vanes of the vane sector extend in the second space, and the radially inner wall of the vane sector is disposed on the bearing surfaces. In this case, the step of causing the first part to be brought closer to the second part results in the rims of the radially inner wall of the vane sector being each interposed between one of the pressure surfaces and one of the bearing surfaces.

Preferably, the second part includes a base which delimits, with the bearing blocks, a third space into which the second space opens. Moreover, at the end of the step of installing the radially inner wall of the vane sector on the second part, a radially outer wall of the vane sector is housed in the third space.

Preferably, the first part is translationally guided relative to the second part by means for guiding the crimping attachment device, during the step of causing the first part to be brought closer to the second part.

The invention also relates to a crimping attachment device, able to attach opposite free axial ends of an abradable piece support by deforming rims formed at opposite axial ends of a radially inner wall of a vane sector of a turbomachine, respectively on said free axial ends.

According to the invention, the device comprises a first part including at least two pressure blocks secured to each other, delimiting between them a first space able to house a median portion of the abradable piece support, and having respective pressure surfaces able to exert a pressure on the rims of the radially inner wall of the vane sector respectively, and a second part able to support the radially inner wall of the vane sector.

Preferably, the first space is dimensioned to further house an abradable piece attached to the abradable piece support.

Preferably, the second part includes at least two bearing blocks which delimits between them a second space able to house vanes of the vane sector, and which have respective bearing surfaces able to support the radially inner wall of the vane sector.

Preferably, the second part includes a base which delimits, with the bearing blocks, a third space into which the second space opens and able to house a radially outer wall of the vane sector.

Preferably, the device further includes guiding means configured to translationally guide the first part relative to the second part so as to enable the pressure surfaces to be brought closer to the bearing surfaces.

BRIEF DESCRIPTION OF THE DRAWINGS

The invention will be better understood, and further details, advantages and characteristics thereof will appear upon reading the following description made by way of non limiting example and with reference to the accompanying drawings in which.

Throughout these figures, identical references can designate identical or analogous elements.

DETAILED DISCLOSURE OF PREFERRED EMBODIMENTS

Figure 3:
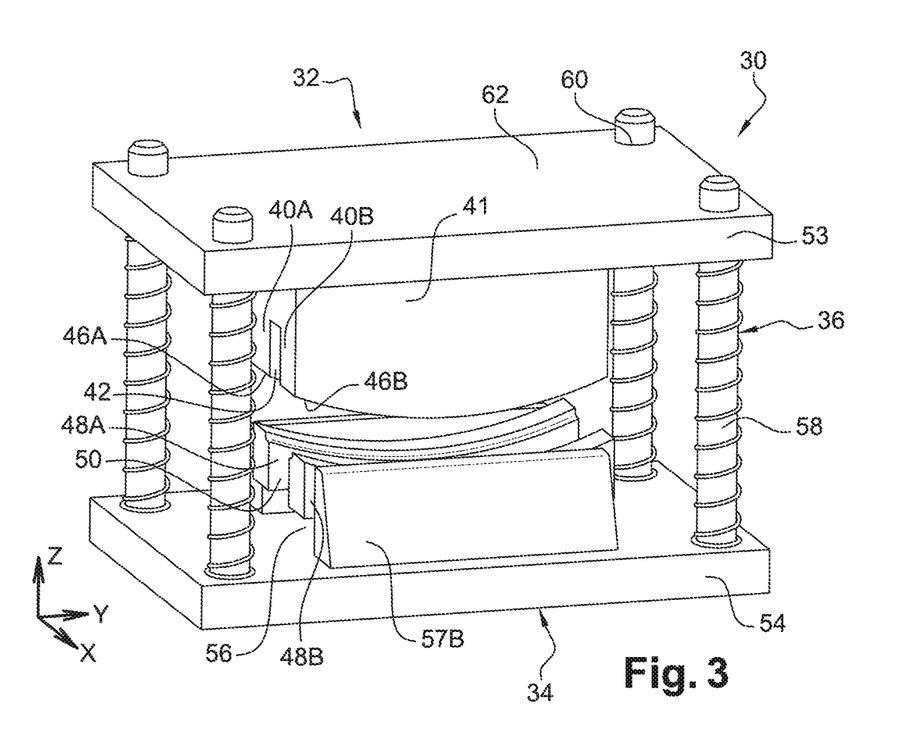
FIG. 3 is a perspective schematic view of a crimping attachment device according to a first preferred embodiment of the invention, for attaching the abradable piece support to the radially inner wall of the vane sector of FIG. 1.
Figure 4:
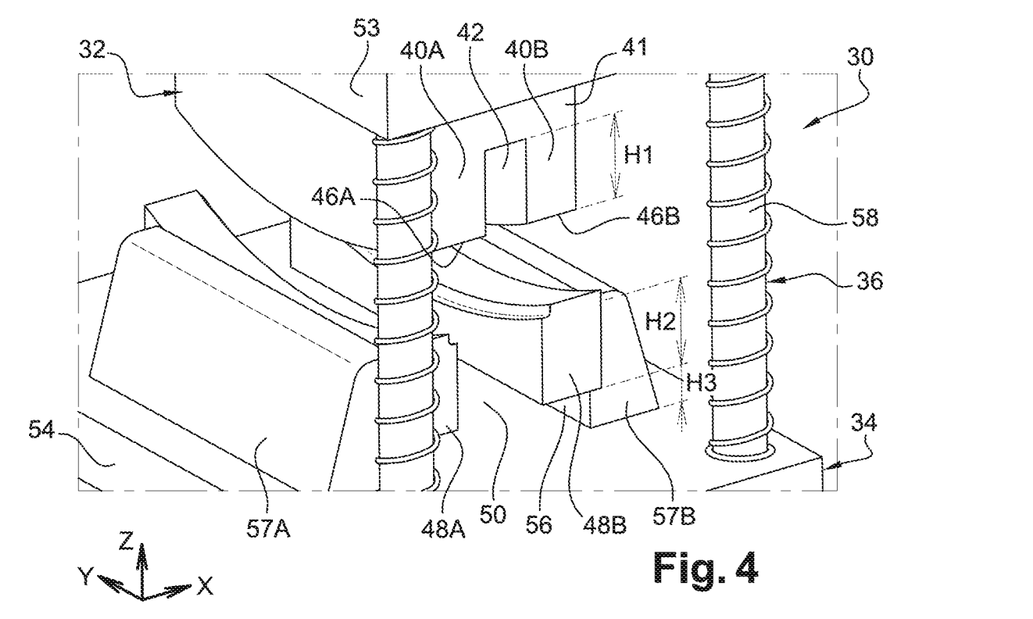
FIGS. 4 and 5 are partial schematic perspective views of the crimping attachment device of FIG. 3.
Figure 5:
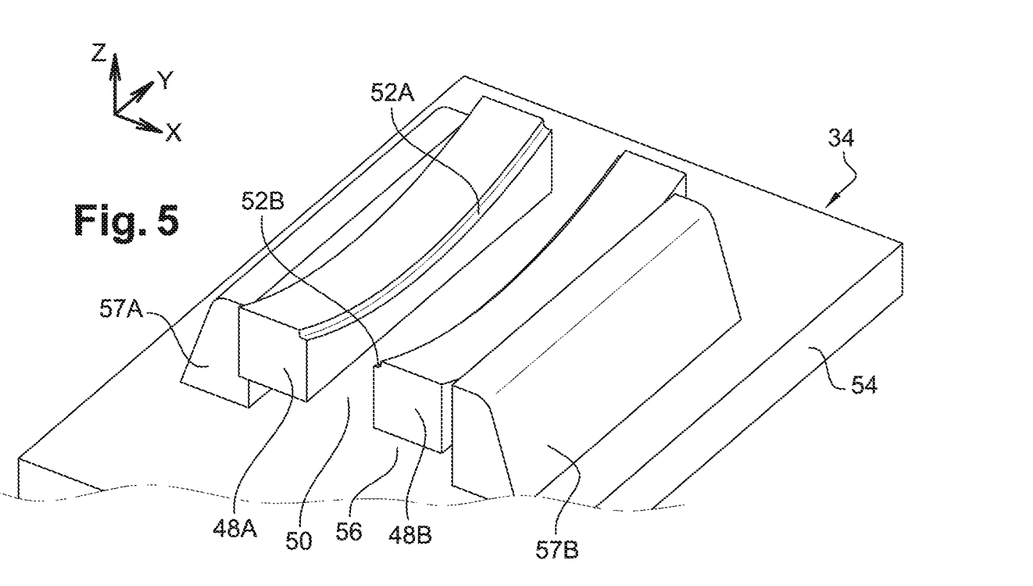
Figure 6:
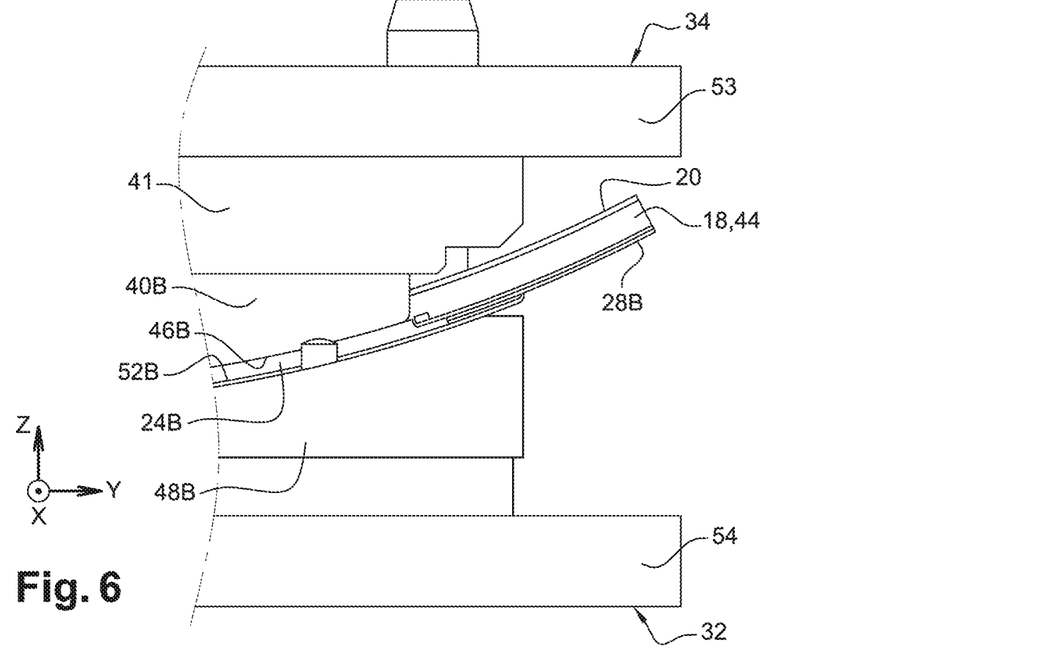
FIG. 6 is a partial schematic view, in a cross-section along a plane YZ, of the crimping attachment device of FIG. 3.

FIGS. 3 to 5 illustrate a crimping attachment device 30 according to a first preferred embodiment of the invention, for enabling the abradable piece support 18 to be attached to the radially inner wall 16 of the vane sector 10 of FIGS. 1 and 2A or of a vane sector of an analogous type.

Orientation of figures is defined by an orthonormal reference frame X, Y, Z. Moreover, the "radial", "circumferential" and "axial" directions are defined with reference to an axis A of the vane sector, corresponding to the axis that a complete vane assembly comprising this vane sector would have.

The crimping attachment device 30 (FIG. 3) comprises a first part 32 and a second part 34 which are preferentially connected to each other by guiding means 36 enabling the first part 32 to be translationally guided relative to the second part 34 along the direction Z.

The first part 32 (FIG. 4) includes at least two pressure blocks 40A, 40B delimiting a first space 42 between them able to house a median portion 44 of the abradable piece support 18 (FIGS. 1 and 2A-2C). The pressure blocks 40A, 40B are secured to each other, that is stationary relative to each other. To this end, the pressure blocks 40A, 40B are for example attached to a support block 41 or are made as a single piece with this support block 41.

Advantageously, the first space 42 has a depth H1 sufficient to further house the abradable piece 20 attached to the abradable piece support 18 (referred to FIG. 4: depth H1 is defined along the direction Z). As an alternative, the first space 42 can have a smaller depth H1, in which case the abradable piece 20 can be attached to the abradable piece support 18 subsequently to the use of the crimping attachment device 30.

The pressure blocks 40A, 40B have respective pressure surfaces 46A, 46B which are respectively provided to exert a pressure on the rims 24A, 24B of the radially inner wall 16 of the vane sector 10, along the direction Z.

The second part 34 is designed to support the radially inner wall 16 of the vane sector (FIGS. 4 and 5).

To this end, the second part 34 preferably includes two bearing blocks 48A, 48B spaced apart from one another so as to delimit a second space 50 between them intended to accommodate the vanes 12 of the vane sector 10.

In order to facilitate the operation of inserting the vane sector 10 between both bearing blocks 48A, 48B, these bearing blocks can be mounted movable relative to each other along the direction X. Thus, inserting the vane sector 10 between both bearing blocks 48A, 48B can be easily performed when both bearing blocks are relatively remote from one another, whereas the operations of attaching by crimping can be implemented subsequently after the bearing blocks 48A, 48B have been brought closer to each other, as will be clearer in what follows.

The bearing blocks 48A, 48B have respective bearing surfaces 52A, 52B for supporting the radially inner wall 16 of the vane sector (FIG. 5) by opposing the pressure exerted by the pressure surfaces 48A, 48B.

The bearing surfaces 52A, 52B can have a curvature similar to the curvature of the radially inner wall 16 of the vane sector respectively at the contact zones of the latter with the bearing surfaces 52A, 52B. Such a configuration enables the homogeneity of the pressure applied to the rims 24A, 24B to be optimized.

Alternatively, the radius of curvature of the bearing surfaces 52A, 52B can be smaller than the radius of curvature of the radially inner wall 16 when it is desirable that the pressure applied to the circumferential ends of the rims 24A, 24B is stronger than the pressure applied to a median part of each of these rims 24A, 24B.

In the illustrated example, the first part includes a base 53.

Moreover, the second part 34 includes a base 54 which delimits, with the bearing blocks 48A, 48B, a third space 56 into which the second space 50 opens. This third space 56, which is therefore arranged between each of the bearing blocks 48A, 48B and the base 54, is configured to house the radially outer wall 14 of the vane sector 10.

The bearing blocks 48A, 48B are for example carried by support blocks 57A, 57B anchored in the base 54 of the second part 34 and enabling to keep the bearing blocks 48A, 48B spaced apart from this base 54.

The guiding means 36 (FIG. 3) are for example formed by columns 58 anchored in the base 54 of the second part 34, and slidably mounted through corresponding apertures 60 of the base 53 of the first part 32.

It is to be noted that FIGS. 3 to 6 are schematic diagrams that do not respect proportions, for the sake of clarity. In particular, the second and third spaces 50, 56 have in fact greater depths H2, H3 (FIG. 4) respectively than is suggested in the figures, these depths being respectively sufficient for the second space 50 to be able to house the vanes 12 and for the third space 56 to be able to house the radially outer wall 14, in spite of the curvature of the vane sector 10.

The crimping attachment device 30 is provided for implementing a method generally comprising the steps of:

installing the radially inner wall 16 of the vane sector on the second part 34, as explained above, so that said wall has an orientation such that the axis A of the vane sector is substantially parallel to direction X;

mounting the abradable piece support 18 on the vane sector 10 by respectively inserting the free axial ends 28A, 28B of the abradable piece support into the grooves 26A, 26B respectively delimited by the rims 24A, 24B of the radially inner wall 16 of the vane sector, and by disposing the median portion 44 of the abradable piece support in the first space 42 or facing the latter; then causing the first part 32 to be brought closer to the second part 34, so that the pressure surfaces 46A, 46B exert a pressure on the rims 24A, 24B until the latter are deformed against the free axial ends 28A, 28B of the abradable piece support 18 so as to tighten the free axial ends 28A, 28B in the grooves 26A, 26B.

It is to be noted that the step of mounting the abradable piece support 18 on the vane sector 10 can, alternatively, be implemented before the step of installing the radially inner wall 16 of the vane sector on the second part 34.

Bringing the first part 32 closer to the second part 34 can be implemented by means of a "press" type machine (not shown in the figures) having a jack that an operator or a robot applies on an upper face 62 of the base 53 of the first part 32 (FIG. 3), whereas the second part 34 is kept stationary relative to a chassis of the press.

The first space 42 enables the abradable piece support 18 and, if need be, the abradable piece 20 to be accommodated, when the pressure blocks 40A, 40B respectively get closer to the bearing blocks 48A, 48B.

More precisely, in the embodiment implementing the illustrated crimping attachment device 30, at the end of the step of installing the radially inner wall 16 of the vane sector on the second part 34, the vanes 12 of the vane sector extend in the second space 50, and a radially outer face of the radially inner wall 16 of the vane sector is disposed on the bearing surfaces 52A, 52B. In the illustrated example, said radially outer surface is formed by the aerodynamic casing 16A. Moreover, the radially outer wall 14 of the vane sector is housed in the third space 56.

During the step of bringing both parts 32 and 34 closer, the columns 58 slide in the apertures 60 of the base 53 as both parts 32 and 34 undergo their relative motion.

When both parts 32 and 34 are brought closer to each other, the rims 24A, 24B of the radially inner wall 16 of the vane sector are sandwiched between the pressure surfaces 46A, 46B and the bearing surfaces 52A, 52B.

Furthermore, the abradable piece support 18 of the vane sector preferably has a greater circumferential extent than the circumferential extent of the bearing surfaces 52A, 52B. Thus, two opposed circumferential end parts of the abradable piece support 18 protrude beyond the corresponding circumferential ends of the bearing surfaces 52A, 52B. This characteristic can be taken to advantage to modify at will the abradable piece support 18 axial position relative to the radially inner wall 16 of the vane sector, before the step resulting in tightening the abradable piece support 18 on the radially inner wall 16.

The operation of adjusting the position of the abradable piece support 18 can thus be integrated to the crimping attachment method, which enables a reduction of erroneous positioning risks and a time saving.

Figure 7:
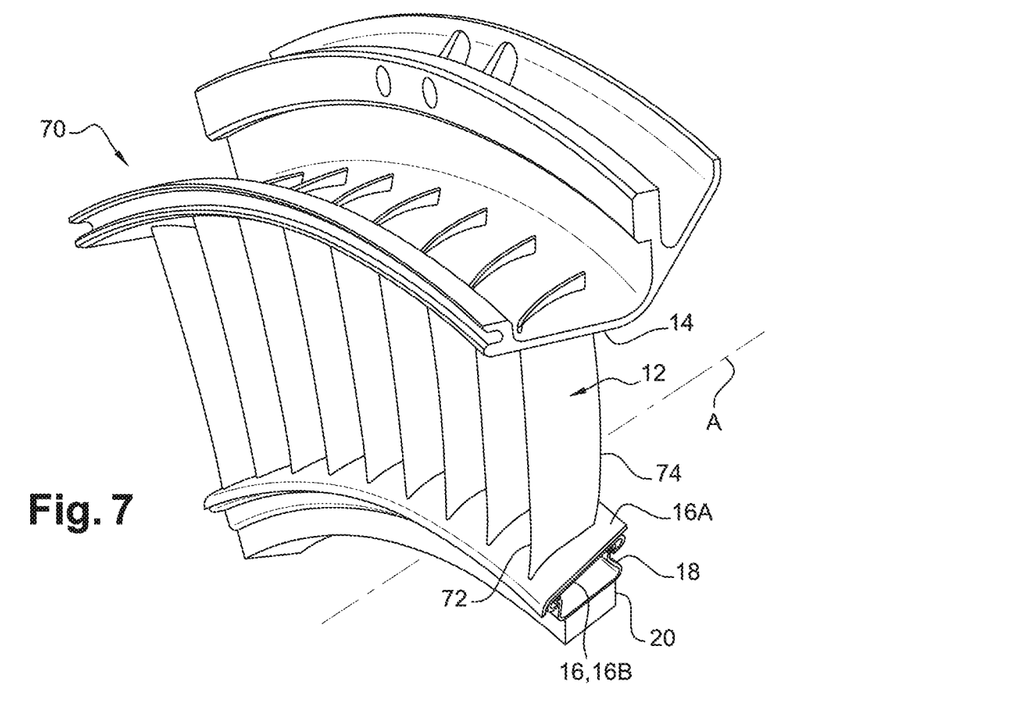
FIG. 7 is a perspective schematic view of a turbine engine vane sector of another known type.

FIG. 7 illustrates a vane sector 70 of another type, which can be distinguished from the above-described vane sector 10 due to the respective leading edges 72 and trailing edges 74 of the vanes 12 extending too closely to the edges of the radially inner wall 16 to enable the use of the above-described device 30.

Figure 8:
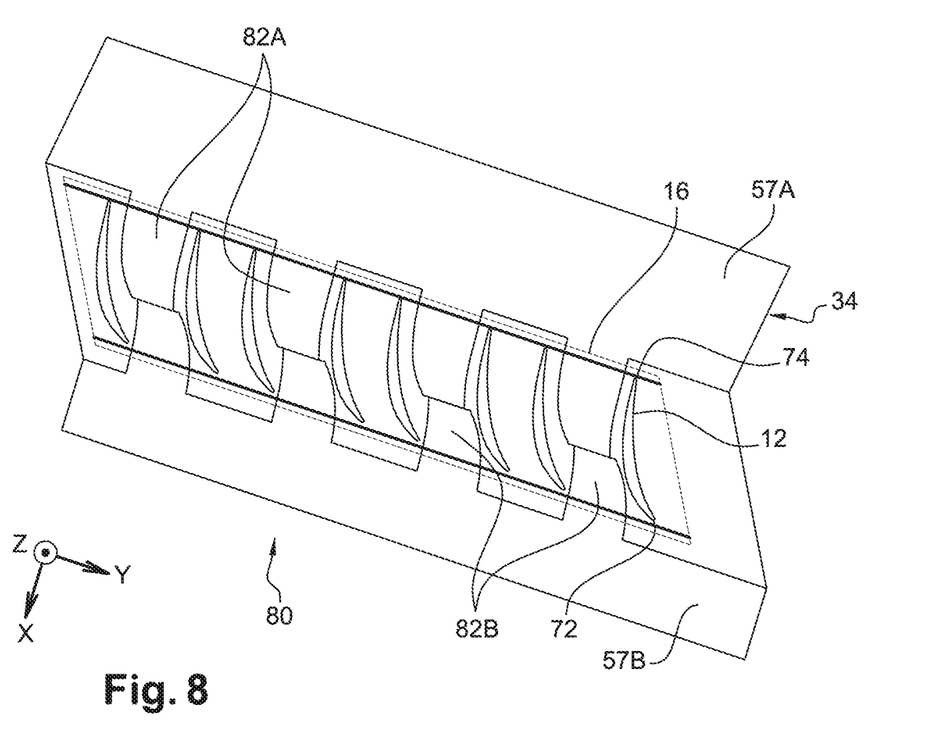
FIG. 8 is a partial schematic view, in a cross-section along a plane XY, of the vane sector of FIG. 7 installed in a crimping attachment device according to a second preferred embodiment of the invention.

In order to solve this problem, it is provided as an alternative a crimping attachment device 80 generally similar to the device 30 but which differs from the latter due to its second part 34 including a plurality of bearing blocks 82A spaced apart from one another and extending axially protrudingly (that is along direction X) from one of the support blocks 57A, and a plurality of bearing blocks 82B spaced apart from one another and extending axially protrudingly from the other support block 57B, respectively facing the bearing blocks 82A.

Spaces formed between the consecutive bearing blocks enable the vanes 12 of the vane sector 10 to pass therethrough.

The bearing blocks 82A, 82B thus have respective bearing surfaces for the regions of the radially inner wall 16 located between the vanes 12.

It is to be noted that the method and device according to the invention can be applied to different types of vane sectors. Thus, the rims 24A, 24B of the radially inner wall of the vane sector can, alternatively, be shaped so as to form axially open grooves in opposite directions, that is according to a reverse orientation relative to the one of the above-described vane sector. In this case, the free axial ends 28A, 28B of the abradable piece support 18 are folded so as to be axially oriented towards each other.

Generally speaking, the crimping attachment device and method according to the invention make it possible to secure both free axial ends 28A, 28B of an abradable piece support 18 and the radially inner wall 16 of a vane sector jointly, which ensures time saving and reliability gain relative to methods of a known type based on the use of clamps.

Moreover, the method according to the invention is readily automatable, unlike the abovementioned methods of a known type which require the intervention of a human operator.

What is claimed is:

1. A method for crimping attachment of an abradable piece support to a radially inner wall of a vane sector of a turbomachine, the radially inner wall of the vane sector comprising rims formed at opposite axial ends of the radially inner wall of the vane sector and respectively delimiting grooves which open axially inwardly towards one another, the method comprising the steps of:
    providing a crimping attachment device comprising a first part including at least two pressure blocks secured to each other, delimiting a first space therebetween, and having respective pressure surfaces, and a second part able to support the radially inner wall of the vane sector;
    installing the radially inner wall of the vane sector on the second part;
    mounting the abradable piece support on the vane sector by respectively inserting, along a direction transverse the subsequent direction of crimping, opposite free axial ends of the abradable piece support into the grooves respectively delimited by the rims of the radially inner wall of the vane sector, and by disposing a median portion of the abradable piece support in the first space or facing the first space; and
    after insertion of the opposite free axial ends of the abradable piece support, causing the first part to be brought closer to the second part so that the pressure surfaces exert a pressure on the rims of the radially inner wall of the vane sector so as to deform the rims on the free axial ends of the abradable piece support, until the rims provide a tightening of the free axial ends of the abradable piece support.

2. The method according to claim 1, wherein, at the end of the step of causing the first part to be brought closer to the second part, an abradable piece attached to the median portion of the abradable piece support is housed in the first space.

3. The method according to claim 1, wherein the first part is translationally guided relative to the second part by guiding means of the crimping attachment device during the step of causing the first part to be brought closer to the second part.

4. The method according to claim 1, wherein the inserting the free axial ends of the abradable piece support includes inserting these free axial ends into the grooves of the inner radial wall being axially-open in opposed axial directions along axes parallel to a central longitudinal axis of the vane sector.

5. The method according to claim 1, wherein the exerting a pressure on the rims further includes exerting pressure in opposed radially inward and radially outward directions of the inner wall of the vane sector.

6. The method according to claim 1, wherein the second part includes at least two bearing blocks delimiting a second space between them and having respective bearing surfaces, and
    wherein at the end of the step of installing the radially inner wall of the vane sector on the second part, vanes of the vane sector extend in the second space, and the radially inner wall of the vane sector is disposed on the bearing surfaces, so that the step of causing the first part to be brought closer to the second part results in the rims of the radially inner wall of the vane sector being each interposed between one of the pressure surfaces and one of the bearing surfaces.

7. The method according to claim 6, wherein the second part includes a base which delimits, with the bearing blocks, a third space into which the second space opens, and
    wherein at the end of the step of installing the radially inner wall of the vane sector on the second part, a radially outer wall of the vane sector is housed in the third space.

8. A method for crimping attachment of an abradable piece support to a radially inner wall of a vane sector of a turbomachine, the radially inner wall of the vane sector comprising rims formed at opposite axial ends of the radially inner wall of the vane sector and respectively delimiting grooves which open axially inwardly towards one another, the method comprising the steps of:
    providing a crimping attachment device comprising a first part including at least two pressure blocks secured to each other, delimiting a first space therebetween, and having respective pressure surfaces, and a second part able to support the radially inner wall of the vane sector, a longitudinal gap extending between and along each of the first and second parts;
    installing the radially inner wall of the vane sector on the second part by inserting an end of the radially inner wall into an open end of the longitudinal gap, the inserting being in a direction transverse a direction of subsequent crimping;
    mounting the abradable piece support on the vane sector by respectively inserting, along a direction transverse the subsequent direction of crimping, opposite free axial ends of the abradable piece support into the grooves respectively delimited by the rims of the radially inner wall of the vane sector, and by disposing a median portion of the abradable piece support in the first space or facing the first space; and
    after insertion of the opposite free axial ends of the abradable piece support, causing the first part to be brought closer to the second part so that the pressure surfaces exert a pressure on the rims of the radially inner wall of the vane sector so as to deform the rims on the free axial ends of the abradable piece support, until the rims provide a tightening of the free axial ends of the abradable piece support.

* * * * *